Patented Apr. 9, 1929.

1,708,435

UNITED STATES PATENT OFFICE.

HARRY R. WARREN, OF CHICAGO, ILLINOIS, ASSIGNOR, BY MESNE ASSIGNMENTS, TO WARREN-TEED SEED COMPANY, OF CHICAGO, ILLINOIS, A CORPORATION OF NEVADA.

SEED-SEPARATING PROCESS AND SOLUTION THEREFOR.

No Drawing.   Application filed January 23, 1928.   Serial No. 243,973.

This invention relates to solutions employed in separating different classes of seeds according to their respective specific gravities. In making such separations the solutions employed have a specific gravity which is less than that of one of the classes of seeds in any given mixture and greater than that of another class, to the end that one class of seeds will sink or settle in the solution while the other, or lighter class, will rise in the solution. The density of the solution employed will depend upon the character of the mixture of seeds and the relative specific gravities of the seeds entering into the mixture and will vary from a very weak solution to a solution having a density as high as 40° B. Moreover, the time during which the seeds are subjected to the action of the solution to effect proper separation will vary with different mixtures of seeds. It is important that the separating solution should not be of such character as to injure or lessen the germination of the seed. It is in fact desirable that the solution should have the quality of increasing the germinating tendency of the seed, that is, act as a stimulant to germination. Moreover, it is important, where seeds are separated on a large commercial scale and many thousands of gallons of such solutions are employed, that the cost of the material entering into the solution be reduced to a minimum.

The object of the present invention is to provide a seed separating solution which shall be effective in securing the ready separation of the different classes of seeds in a given mixture and shall stimulate, or at least not deteriorate, the germinating properties of the seed and which can be produced at a minimum cost.

With this object in view, the invention consists of a solution of a suitable nitrate or nitrates, commercial glucose and a small percentage of a suitable phosphate or phosphates, such as sodium phosphate. The proportions of the respective ingredients entering into the solution may be varied within limits and may differ with different classes of seeds to be treated, but preferably 77 pounds of a suitable nitrate, such as sodium nitrate, 20 pounds of commercial glucose and 3 pounds of a suitable phosphate, such as sodium phosphate are dissolved in a suitable solvent such as water. These proportions may be varied within limits but those given above have been found, in practical experience, to produce excellent results. If desired, a very small amount of copper sulphate may be incorporated in the solution, though this is not essential.

It will be understood, of course, that the amount of water to be employed will depend entirely upon the strength of the solution desired, a large amount being employed for a weak solution and a decreased amount for a stronger solution.

In the use of the solution, the mixture of seeds is immersed in the solution which is preferably agitated by any suitable means, after which the same is permitted to become quiescent, when it will be found that the lighter seeds will rise, or even float, in the solution while the heavier seeds will settle therein thus separating the several classes into strata.

When the density of the solution is properly adjusted with respect to the seed to be separated, the stratification should be effected in approximately twenty minutes, a length of time which will not allow the solution to penetrate the shell or coating of most seeds to an injurious extent. The presence of the glucose in the solution also tends to check penetration of the seeds' coating, while the sodium phosphate has been found to stimulate germination and contribute to a profuse growth when the seeds are planted. The sodium nitrate affords an excellent low priced main ingredient in the solution.

Having thus described the invention, what is claimed is:

1. The process of separating a mixture of seeds which consists in immersing the mixture in a solution of sodium nitrate, sodium phosphate and commercial glucose.

2. The process of separating a mixture of seeds which consists in immersing the mixture in a solution containing sodium nitrate, sodium phosphate and commercial glucose in the proportions of sodium nitrate approximately 77 percent, sodium phosphate approximately 3 percent and commercial glucose approximately 20 percent.

3. The process of separating a mixture of seeds which consists in immersing the mixture in a solution of sodium nitrate and commercial glucose with a small percentage of sodium phosphate.

4. A seed separating solution comprising a solvent, a suitable nitrate, sodium phosphate and glucose.

5. A seed separating solution comprising approximately 77 percent of a suitable nitrate, 20 percent of commercial glucose and 3 percent of sodium phosphate dissolved in a suitable solvent.

6. A seed separating solution comprising a suitable solvent in which there is dissolved suitable nitrates, sodium phosphate and glucose in the proportions of 77 parts of nitrates, 3 parts of sodium phosphate and 20 parts of commercial glucose.

7. A seed separating solution comprising a suitable solvent in which there is dissolved sodium nitrate, sodium phosphate, glucose, and a small percentage of copper sulphate.

8. A seed separating solution comprising a suitable solvent in which there is dissolved sodium nitrate and primary sodium phosphate.

In testimony whereof I have signed this specification.

HARRY R. WARREN.